US008620353B1

(12) United States Patent
Kahn et al.

(10) Patent No.: US 8,620,353 B1
(45) Date of Patent: Dec. 31, 2013

(54) AUTOMATIC SHARING AND PUBLICATION OF MULTIMEDIA FROM A MOBILE DEVICE

(75) Inventors: Philippe Kahn, Aptos, CA (US); Arthur Kinsolving, Santa Cruz, CA (US); Panduranga R Rudraraju, Scotts Valley, CA (US); Brian Bodmer, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1190 days.

(21) Appl. No.: 11/698,632

(22) Filed: Jan. 26, 2007

(51) Int. Cl.
*H04W 24/00* (2009.01)
*H04M 11/00* (2006.01)
*H04M 3/42* (2006.01)
*H04M 3/00* (2006.01)
*H04W 4/00* (2009.01)
*H04B 7/00* (2006.01)
*H04M 1/00* (2006.01)
*G06F 15/16* (2006.01)
*G06F 15/173* (2006.01)

(52) U.S. Cl.
USPC ............... 455/456.3; 455/405; 455/414.1; 455/419; 455/466; 455/519; 455/550.1; 455/569.1; 709/206; 709/224

(58) Field of Classification Search
USPC ........ 370/310; 709/206, 224; 455/405, 456.3, 455/414.1, 419, 466, 519, 550.1, 569.1
See application file for complete search history.

(56) References Cited

U.S. PATENT DOCUMENTS

| 4,285,041 | A | 8/1981 | Smith |
|---|---|---|---|
| 4,571,680 | A | 2/1986 | Wu |
| 4,578,769 | A | 3/1986 | Frederick |
| 4,700,369 | A | 10/1987 | Siegal et al. |
| 4,776,323 | A | 10/1988 | Spector |
| 5,323,060 | A | 6/1994 | Gast et al. |
| 5,386,210 | A | 1/1995 | Lee |

(Continued)

FOREIGN PATENT DOCUMENTS

| EP | 1 104 143 | 5/2001 |
|---|---|---|
| EP | 0 833 537 | 7/2002 |

(Continued)

OTHER PUBLICATIONS

"Access and Terminals (AT); Multimedia Message Service (MMS) for PSTN/ISDN; Multimedia Message Communication between a fixed network Multimedia Message Terminal Equipment and a Multimedia Message Service Centre," ETSI AT-F Rapporteur Meeting, Feb. 4-6, 2003, Gothenburg, DES/AT-030023 V0.0.1 (Mar. 2003).

(Continued)

*Primary Examiner* — Inder Mehra
(74) *Attorney, Agent, or Firm* — Blakely, Sokoloff, Taylor & Zafman LLP; Judith A. Szepesi (57) ABSTRACT

Multimedia from a mobile device is automatically distributed to multiple and various types of shares specified by a default destination. The mobile device generates a media package from the multimedia and sensor meta data. The media package is transmitted to a server that optimizes the multimedia before distributing the multimedia to the shares. Alternatively, the multimedia may be distributed to shares specified in a different destination that is input through the mobile device. Delivery instructions corresponding to the shares for the different destination are included in the media package. In another aspect, the mobile device sends share identifiers to the server to define the default destination for the user account.

39 Claims, 6 Drawing Sheets

(56) References Cited

U.S. PATENT DOCUMENTS

| | | |
|---|---|---|
| 5,430,480 A | 7/1995 | Allen et al. |
| 5,446,725 A | 8/1995 | Ishiwatari |
| 5,446,775 A | 8/1995 | Wright et al. |
| 5,454,114 A | 9/1995 | Yach et al. |
| 5,485,402 A | 1/1996 | Smith et al. |
| 5,506,987 A | 4/1996 | Abramson et al. |
| 5,583,776 A | 12/1996 | Levi et al. |
| 5,593,431 A | 1/1997 | Sheldon |
| 5,654,619 A | 8/1997 | Iwashita |
| 5,703,786 A | 12/1997 | Conkright |
| 5,737,439 A | 4/1998 | Lapsley et al. |
| 5,771,001 A | 6/1998 | Cobb |
| 5,778,882 A | 7/1998 | Raymond et al. |
| 5,911,065 A | 6/1999 | Williams et al. |
| 5,955,667 A | 9/1999 | Fyfe |
| 5,955,871 A | 9/1999 | Nguyen |
| 5,960,085 A | 9/1999 | de la Huerga |
| 5,976,083 A | 11/1999 | Richardson et al. |
| 6,013,007 A | 1/2000 | Root et al. |
| 6,061,456 A | 5/2000 | Andrea et al. |
| 6,122,595 A | 9/2000 | Varley et al. |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,353,449 B1 | 3/2002 | Gregg et al. |
| 6,369,794 B1 | 4/2002 | Sakurai et al. |
| 6,396,883 B2 | 5/2002 | Yang et al. |
| 6,408,330 B1 | 6/2002 | de la Huerga |
| 6,428,490 B1 | 8/2002 | Kramer et al. |
| 6,470,147 B1 | 10/2002 | Imada |
| 6,478,736 B1 | 11/2002 | Mault |
| 6,493,652 B1 | 12/2002 | Ohlenbusch et al. |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,529,144 B1 | 3/2003 | Nilsen et al. |
| 6,532,419 B1 | 3/2003 | Begin et al. |
| 6,539,336 B1 | 3/2003 | Vock et al. |
| 6,595,929 B2 | 7/2003 | Stivoric et al. |
| 6,607,493 B2 | 8/2003 | Song |
| 6,611,789 B1 | 8/2003 | Darley |
| 6,628,898 B2 | 9/2003 | Endo |
| 6,634,992 B1 | 10/2003 | Ogawa |
| 6,665,802 B1 | 12/2003 | Ober |
| 6,672,991 B2 | 1/2004 | O'Malley |
| 6,685,480 B2 | 2/2004 | Nishimoto et al. |
| 6,700,499 B2 | 3/2004 | Kubo et al. |
| 6,731,958 B1 | 5/2004 | Shirai |
| 6,766,176 B1 | 7/2004 | Gupta et al. |
| 6,771,250 B1 | 8/2004 | Oh |
| 6,786,877 B2 | 9/2004 | Foxlin |
| 6,788,980 B1 | 9/2004 | Johnson |
| 6,790,178 B1 | 9/2004 | Mault et al. |
| 6,813,582 B2 | 11/2004 | Levi et al. |
| 6,823,036 B1 | 11/2004 | Chen |
| 6,826,477 B2 | 11/2004 | Ladetto et al. |
| 6,836,744 B1 | 12/2004 | Asphahani et al. |
| 6,881,191 B2 | 4/2005 | Oakley et al. |
| 6,885,971 B2 | 4/2005 | Vock et al. |
| 6,895,425 B1 | 5/2005 | Kadyk et al. |
| 6,898,550 B1 | 5/2005 | Blackadar et al. |
| 6,928,382 B2 | 8/2005 | Hong et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 7,010,332 B1 | 3/2006 | Irvin et al. |
| 7,020,487 B2 | 3/2006 | Kimata |
| 7,027,087 B2 | 4/2006 | Nozaki et al. |
| 7,028,547 B2 | 4/2006 | Shiratori et al. |
| 7,042,509 B2 | 5/2006 | Onuki |
| 7,054,784 B2 | 5/2006 | Flentov et al. |
| 7,057,551 B1 | 6/2006 | Vogt |
| 7,072,789 B2 | 7/2006 | Vock et al. |
| 7,092,846 B2 | 8/2006 | Vock et al. |
| 7,096,619 B2 | 8/2006 | Jackson et al. |
| 7,148,797 B2 | 12/2006 | Albert |
| 7,149,964 B1 | 12/2006 | Cottrille et al. |
| 7,155,507 B2 | 12/2006 | Hirano et al. |
| 7,158,912 B2 | 1/2007 | Vock et al. |
| 7,169,084 B2 | 1/2007 | Tsuji |
| 7,171,222 B2 | 1/2007 | Fostick |
| 7,171,331 B2 | 1/2007 | Vock et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,177,684 B1 | 2/2007 | Kroll et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,200,517 B2 | 4/2007 | Darley et al. |
| 7,212,230 B2 | 5/2007 | Stavely |
| 7,212,943 B2 | 5/2007 | Aoshima et al. |
| 7,220,220 B2 | 5/2007 | Stubbs et al. |
| 7,254,516 B2 | 8/2007 | Case et al. |
| 7,280,096 B2 | 10/2007 | Marvit et al. |
| 7,280,849 B1 | 10/2007 | Bailey |
| 7,297,088 B2 | 11/2007 | Tsuji |
| 7,301,526 B2 | 11/2007 | Marvit et al. |
| 7,301,527 B2 | 11/2007 | Marvit et al. |
| 7,301,528 B2 | 11/2007 | Marvit et al. |
| 7,301,529 B2 | 11/2007 | Marvit et al. |
| 7,305,323 B2 | 12/2007 | Skvortsov et al. |
| 7,328,611 B2 | 2/2008 | Klees et al. |
| 7,334,472 B2 | 2/2008 | Seo et al. |
| 7,353,112 B2 | 4/2008 | Choi et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,379,999 B1 | 5/2008 | Zhou et al. |
| 7,387,611 B2 | 6/2008 | Inoue et al. |
| 7,397,357 B2 | 7/2008 | Krumm et al. |
| 7,451,056 B2 | 11/2008 | Flentov et al. |
| 7,457,719 B1 | 11/2008 | Kahn et al. |
| 7,457,872 B2 | 11/2008 | Aton et al. |
| 7,463,997 B2 | 12/2008 | Pasolini et al. |
| 7,467,060 B2 | 12/2008 | Kulach et al. |
| 7,512,515 B2 | 3/2009 | Vock et al. |
| 7,526,402 B2 | 4/2009 | Tanenhaus et al. |
| 7,608,050 B2 | 10/2009 | Sugg |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,664,657 B1 | 2/2010 | Letzt et al. |
| 7,689,107 B2 | 3/2010 | Enomoto |
| 7,705,884 B2 | 4/2010 | Pinto et al. |
| 7,752,011 B2 | 7/2010 | Niva et al. |
| 7,753,861 B1 | 7/2010 | Kahn et al. |
| 7,765,553 B2 | 7/2010 | Douceur et al. |
| 7,774,156 B2 | 8/2010 | Niva et al. |
| 7,788,059 B1 | 8/2010 | Kahn et al. |
| 7,857,772 B2 | 12/2010 | Bouvier et al. |
| 7,881,902 B1 | 2/2011 | Kahn et al. |
| 7,892,080 B1 | 2/2011 | Dahl |
| 7,987,070 B2 | 7/2011 | Kahn et al. |
| 8,187,182 B2 | 5/2012 | Kahn et al. |
| 2001/0047488 A1 | 11/2001 | Verplaetse et al. |
| 2002/0006284 A1 | 1/2002 | Kim |
| 2002/0023654 A1 | 2/2002 | Webb |
| 2002/0027164 A1 | 3/2002 | Mault et al. |
| 2002/0042830 A1 | 4/2002 | Bose et al. |
| 2002/0044634 A1 | 4/2002 | Rooke et al. |
| 2002/0054214 A1 | 5/2002 | Yoshikawa |
| 2002/0089425 A1 | 7/2002 | Kubo et al. |
| 2002/0109600 A1 | 8/2002 | Mault et al. |
| 2002/0118121 A1 | 8/2002 | Lehrman et al. |
| 2002/0138017 A1 | 9/2002 | Bui et al. |
| 2002/0142887 A1 | 10/2002 | O'Malley |
| 2002/0150302 A1 | 10/2002 | McCarthy et al. |
| 2002/0151810 A1 | 10/2002 | Wong et al. |
| 2002/0173295 A1 | 11/2002 | Nykanen et al. |
| 2002/0190947 A1 | 12/2002 | Feinstein |
| 2003/0018430 A1 | 1/2003 | Ladetto et al. |

(56) References Cited

U.S. PATENT DOCUMENTS

| | | |
|---|---|---|
| 2003/0033411 A1 | 2/2003 | Kavoori et al. |
| 2003/0048218 A1 | 3/2003 | Milnes et al. |
| 2003/0083596 A1 | 5/2003 | Kramer et al. |
| 2003/0093187 A1 | 5/2003 | Walker et al. |
| 2003/0101260 A1 | 5/2003 | Dacier et al. |
| 2003/0109258 A1 | 6/2003 | Mantyjarvi et al. |
| 2003/0139692 A1 | 7/2003 | Barrey et al. |
| 2003/0139908 A1 | 7/2003 | Wegerich et al. |
| 2003/0149526 A1 | 8/2003 | Zhou et al. |
| 2003/0151672 A1 | 8/2003 | Robins et al. |
| 2003/0187683 A1 | 10/2003 | Kirchhoff et al. |
| 2003/0208110 A1 | 11/2003 | Mault et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0047498 A1 | 3/2004 | Mulet-Parada et al. |
| 2004/0078219 A1 | 4/2004 | Kaylor et al. |
| 2004/0078220 A1 | 4/2004 | Jackson |
| 2004/0081441 A1 | 4/2004 | Sato et al. |
| 2004/0106958 A1 | 6/2004 | Mathis et al. |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0130628 A1 | 7/2004 | Stavely |
| 2004/0135898 A1 | 7/2004 | Zador |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0176067 A1 | 9/2004 | Lakhani et al. |
| 2004/0185821 A1 | 9/2004 | Yuasa |
| 2004/0219910 A1 | 11/2004 | Beckers |
| 2004/0225467 A1 | 11/2004 | Vock et al. |
| 2004/0236500 A1 | 11/2004 | Choi et al. |
| 2004/0242202 A1 | 12/2004 | Torvinen |
| 2004/0247030 A1 | 12/2004 | Wiethoff |
| 2004/0259494 A1 | 12/2004 | Mazar |
| 2005/0015768 A1 | 1/2005 | Moore |
| 2005/0027567 A1 | 2/2005 | Taha |
| 2005/0033200 A1 | 2/2005 | Soehren et al. |
| 2005/0038691 A1 | 2/2005 | Babu |
| 2005/0048945 A1 | 3/2005 | Porter |
| 2005/0048955 A1 | 3/2005 | Ring |
| 2005/0078197 A1 | 4/2005 | Gonzalez |
| 2005/0079873 A1 | 4/2005 | Caspi et al. |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113649 A1 | 5/2005 | Bergantino |
| 2005/0113650 A1 | 5/2005 | Pacione et al. |
| 2005/0131736 A1 | 6/2005 | Nelson et al. |
| 2005/0141522 A1 | 6/2005 | Kadar et al. |
| 2005/0143106 A1 | 6/2005 | Chan et al. |
| 2005/0146431 A1 | 7/2005 | Hastings et al. |
| 2005/0157181 A1 | 7/2005 | Kawahara et al. |
| 2005/0165719 A1* | 7/2005 | Greenspan et al. ............... 707/1 |
| 2005/0168587 A1 | 8/2005 | Sato et al. |
| 2005/0182824 A1 | 8/2005 | Cotte |
| 2005/0183086 A1 | 8/2005 | Abe et al. |
| 2005/0202934 A1 | 9/2005 | Olrik et al. |
| 2005/0203430 A1 | 9/2005 | Williams et al. |
| 2005/0210300 A1 | 9/2005 | Song et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212760 A1 | 9/2005 | Marvit et al. |
| 2005/0216403 A1 | 9/2005 | Tam et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0234676 A1 | 10/2005 | Shibayama |
| 2005/0235058 A1 | 10/2005 | Rackus et al. |
| 2005/0238132 A1 | 10/2005 | Tsuji |
| 2005/0240375 A1 | 10/2005 | Sugai |
| 2005/0243178 A1 | 11/2005 | McConica |
| 2005/0245988 A1 | 11/2005 | Miesel |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2005/0281289 A1* | 12/2005 | Huang et al. ............... 370/484 |
| 2006/0009243 A1 | 1/2006 | Dahan et al. |
| 2006/0017692 A1 | 1/2006 | Wehrenberg et al. |
| 2006/0020177 A1 | 1/2006 | Seo et al. |
| 2006/0029284 A1 | 2/2006 | Stewart |
| 2006/0063980 A1 | 3/2006 | Hwang et al. |
| 2006/0064276 A1 | 3/2006 | Ren et al. |
| 2006/0080551 A1 | 4/2006 | Mantyjarvi et al. |
| 2006/0090088 A1 | 4/2006 | Choi et al. |
| 2006/0098097 A1 | 5/2006 | Wach et al. |
| 2006/0100546 A1 | 5/2006 | Silk |
| 2006/0109113 A1 | 5/2006 | Reyes et al. |
| 2006/0136173 A1 | 6/2006 | Case et al. |
| 2006/0140422 A1 | 6/2006 | Zurek et al. |
| 2006/0149516 A1 | 7/2006 | Bond et al. |
| 2006/0154642 A1 | 7/2006 | Scannell, Jr. |
| 2006/0161377 A1 | 7/2006 | Rakkola et al. |
| 2006/0161459 A9 | 7/2006 | Rosenfeld et al. |
| 2006/0167387 A1 | 7/2006 | Buchholz et al. |
| 2006/0167647 A1 | 7/2006 | Krumm et al. |
| 2006/0167943 A1 | 7/2006 | Rosenberg |
| 2006/0172706 A1 | 8/2006 | Griffin et al. |
| 2006/0174685 A1 | 8/2006 | Skvortsov et al. |
| 2006/0204214 A1 | 9/2006 | Shah et al. |
| 2006/0206258 A1 | 9/2006 | Brooks |
| 2006/0223547 A1 | 10/2006 | Chin et al. |
| 2006/0249683 A1 | 11/2006 | Goldberg et al. |
| 2006/0256082 A1 | 11/2006 | Cho et al. |
| 2006/0257042 A1 | 11/2006 | Ofek et al. |
| 2006/0259268 A1 | 11/2006 | Vock et al. |
| 2006/0284979 A1 | 12/2006 | Clarkson |
| 2006/0288781 A1 | 12/2006 | Daumer et al. |
| 2006/0289819 A1 | 12/2006 | Parsons et al. |
| 2007/0004451 A1 | 1/2007 | Anderson |
| 2007/0005988 A1 | 1/2007 | Zhang et al. |
| 2007/0017136 A1 | 1/2007 | Mosher et al. |
| 2007/0024441 A1 | 2/2007 | Kahn et al. |
| 2007/0037605 A1 | 2/2007 | Logan et al. |
| 2007/0038364 A1 | 2/2007 | Lee et al. |
| 2007/0040892 A1* | 2/2007 | Aoki et al. ............... 348/14.01 |
| 2007/0050157 A1 | 3/2007 | Kahn et al. |
| 2007/0061105 A1 | 3/2007 | Darley et al. |
| 2007/0063850 A1 | 3/2007 | Devaul et al. |
| 2007/0067094 A1 | 3/2007 | Park et al. |
| 2007/0073482 A1 | 3/2007 | Churchill et al. |
| 2007/0075127 A1 | 4/2007 | Rosenberg |
| 2007/0075965 A1 | 4/2007 | Huppi et al. |
| 2007/0082789 A1 | 4/2007 | Nissila et al. |
| 2007/0104479 A1* | 5/2007 | Machida ............... 396/429 |
| 2007/0106991 A1 | 5/2007 | Yoo |
| 2007/0125852 A1 | 6/2007 | Rosenberg |
| 2007/0130582 A1 | 6/2007 | Chang et al. |
| 2007/0142715 A1 | 6/2007 | Banet et al. |
| 2007/0143068 A1 | 6/2007 | Pasolini et al. |
| 2007/0145680 A1 | 6/2007 | Rosenberg |
| 2007/0150136 A1 | 6/2007 | Doll et al. |
| 2007/0156364 A1 | 7/2007 | Rothkopf |
| 2007/0161410 A1 | 7/2007 | Huang et al. |
| 2007/0165790 A1 | 7/2007 | Taori |
| 2007/0169126 A1 | 7/2007 | Todoroki et al. |
| 2007/0176898 A1 | 8/2007 | Suh |
| 2007/0192483 A1 | 8/2007 | Rezvani et al. |

(56) References Cited

U.S. PATENT DOCUMENTS

| | | |
|---|---|---|
| 2007/0208531 A1 | 9/2007 | Darley et al. |
| 2007/0213126 A1 | 9/2007 | Deutsch et al. |
| 2007/0233788 A1 | 10/2007 | Bender |
| 2007/0239399 A1 | 10/2007 | Sheynblat et al. |
| 2007/0250261 A1 | 10/2007 | Soehren |
| 2007/0259685 A1 | 11/2007 | Engblom et al. |
| 2007/0259716 A1 | 11/2007 | Mattice et al. |
| 2007/0259717 A1 | 11/2007 | Mattice et al. |
| 2007/0260418 A1 | 11/2007 | Ladetto et al. |
| 2007/0260482 A1 | 11/2007 | Nurmela et al. |
| 2007/0263995 A1 | 11/2007 | Park et al. |
| 2007/0281762 A1 | 12/2007 | Barros et al. |
| 2008/0005738 A1 | 1/2008 | Imai et al. |
| 2008/0030586 A1 | 2/2008 | Helbing et al. |
| 2008/0046888 A1 | 2/2008 | Appaji |
| 2008/0052716 A1 | 2/2008 | Theurer |
| 2008/0072014 A1 | 3/2008 | Krishnan et al. |
| 2008/0082994 A1 | 4/2008 | Ito et al. |
| 2008/0113689 A1 | 5/2008 | Bailey |
| 2008/0140338 A1 | 6/2008 | No et al. |
| 2008/0153671 A1 | 6/2008 | Ogg et al. |
| 2008/0165022 A1 | 7/2008 | Herz et al. |
| 2008/0168361 A1 | 7/2008 | Forstall et al. |
| 2008/0171918 A1 | 7/2008 | Teller et al. |
| 2008/0214358 A1 | 9/2008 | Ogg et al. |
| 2008/0231713 A1 | 9/2008 | Florea et al. |
| 2008/0231714 A1 | 9/2008 | Estevez et al. |
| 2008/0232604 A1 | 9/2008 | Dufresne et al. |
| 2008/0243432 A1 | 10/2008 | Kato et al. |
| 2008/0303681 A1 | 12/2008 | Herz et al. |
| 2008/0311929 A1 | 12/2008 | Carro et al. |
| 2009/0017880 A1 | 1/2009 | Moore et al. |
| 2009/0031319 A1 | 1/2009 | Fecioru |
| 2009/0043531 A1 | 2/2009 | Kahn et al. |
| 2009/0047645 A1 | 2/2009 | Dibenedetto et al. |
| 2009/0067826 A1 | 3/2009 | Shinohara et al. |
| 2009/0088204 A1 | 4/2009 | Culbert et al. |
| 2009/0099668 A1 | 4/2009 | Lehman et al. |
| 2009/0124348 A1 | 5/2009 | Yoseloff et al. |
| 2009/0128448 A1 | 5/2009 | Riechel |
| 2009/0174782 A1 | 7/2009 | Kahn et al. |
| 2009/0213002 A1 | 8/2009 | Rani et al. |
| 2009/0215502 A1 | 8/2009 | Griffin, Jr. |
| 2009/0234614 A1 | 9/2009 | Kahn et al. |
| 2009/0274317 A1 | 11/2009 | Kahn et al. |
| 2009/0296951 A1 | 12/2009 | De Haan |
| 2009/0319221 A1 | 12/2009 | Kahn et al. |
| 2010/0056872 A1 | 3/2010 | Kahn et al. |
| 2010/0057398 A1 | 3/2010 | Darley et al. |
| 2010/0199189 A1* | 8/2010 | Ben-Aroya et al. ......... 715/736 |

FOREIGN PATENT DOCUMENTS

| | | |
|---|---|---|
| GB | 2431813 A | 5/2007 |
| JP | 7020547 A | 1/1995 |
| JP | 2001-057695 | 2/2001 |
| JP | 2003-143683 | 5/2003 |
| JP | 2005-309691 | 11/2005 |
| JP | 2006-118909 | 5/2006 |
| JP | 2007-104670 | 4/2007 |
| WO | WO 99/22338 | 5/1999 |
| WO | WO 00/63874 | 10/2000 |
| WO | WO 02/088926 | 11/2002 |

OTHER PUBLICATIONS

PCT/US2008/079752, International Search Report and Written Opinion, Mailed Jan. 9, 2008.

PCT/US2009/044914, International Search Report and Written Opinion, Mailed Aug. 27, 2009.

Anderson, Ian, et al, "Shakra: Tracking and Sharing Daily Activity Levels with Unaugmented Mobile Phones," Mobile Netw Appl, Aug. 3, 2007, pp. 185-199.

Ang, Wei Tech, et al, "Zero Phase Filtering for Active Compensation of Periodic Physiological Motion," Proc 1st IEEE / RAS-EMBS International Conference on Biomedical Robotics and Biomechatronics, Feb. 20-22, 2006, pp. 182-187.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Bourzac, Katherine "Wearable Health Reports," Technology Review, Feb. 28, 2006, <http://www.techreview.com/printer_friendly_article_aspx?id+16431>, Mar. 22, 2007, 3 pages.

Cheng, et al, "Periodic Human Motion Description for Sports Video Databases," Proceedings of the Pattern Recognition, 2004, 5 pages.

Dao, Ricardo, "Inclination Sensing with Thermal Accelerometers", MEMSIC, May 2002, 3 pages.

"Decrease Processor Power Consumption using a CoolRunner CPLD," XILINX XAPP347 (v1.0), May 16, 2001, 9 pages.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jones, L, et al, "Wireless Physiological Sensor System for Ambulatory Use," <http://ieeexplore.ieee.org/xpl/freeabs_all.jsp?tp=&arnumber=1612917&isnumber=33861>, Apr. 3-5, 2006.

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Lee, Hyunseok, et al, A Dual Processor Solution for the MAC Layer of a Software Defined Radio Terminal, Advanced Computer Architecture Laboratory, University of Michigan, 25 pages.

Lee, Seon-Woo, et al., "Recognition of Walking Behaviors for Pedestrian Navigation," ATR Media Integration & Communications Research Laboratories, Kyoto, Japan, pp. 1152-1155.

Margaria, Rodolfo, "Biomechanics and Energetics of Muscular Exercise", Chapter 3, pp. 105-125, Oxford: Clarendon Press 1976.

Milenkovic, Milena, et al, "An Accelerometer-Based Physical Rehabilitation System," IEEE SouthEastern Symposium on System Theory, 2002, pp. 57-60.

Mizell, David, "Using Gravity to Estimate Accelerometer Orientation", Seventh IEEE International Symposium on Wearable Computers, 2003, 2 pages.

Ormoneit, D, et al, Learning and Tracking of Cyclic Human Motion: Proceedings of NIPS 2000, Neural Information Processing Systems, 2000, Denver, CO, pp. 894-900.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

(56) References Cited

OTHER PUBLICATIONS

Ricoh, "Advanced digital technology changes creativity," <http://www.ricoh.com/r_dc/gx/gx200/features2.html>, Accessed May 12, 2011, 4 pages.

"Sensor Fusion," <www.u-dynamics.com>, accessed Aug. 29, 2008, 2 pages.

Shen, Chien-Lung, et al, "Wearable Band Using a Fabric-Based Sensor for Exercise ECG Monitoring," IEEE Int. Symp. on Wearable Computers, 2006, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.

Wang, Shu, et al, "Location Based Services for Mobiles: Technologies and Standards, LG Electronics MobileComm," IEEE ICC 2008, Beijing, pp. 1-66 (part 1 of 3).

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weckesser, P, et al, "Multiple Sensorprocessing for High-Precision Navigation and Environmental Modeling with a Mobile Robot," IEEE, 1995, pp. 453-458.

Weinberg, Harvey, "Minimizing Power Consumption of iMEMS® Accelerometers," Analog Devices, <http://www.analog.com/static/imported-files/application_notes/5935151853362884599AN601.pdf>, 2002, 5 pages.

Weinberg, Harvey, "MEMS Motion Sensors Boost Handset Reliability" Jun. 2006, <http://www.mwrf.com/Articles/Print.cfm?ArticleID=12740>, Feb. 21, 2007, 3 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

Yoo, Chang-Sun, et al, "Low Cost GPS/INS Sensor Fusion System for UAV Navigation," IEEE, 2003, 9 pages.

Zypad WL 1100 Wearable Computer, <http://www.eurotech.fi/products/manuals/Zypad%20WL%201100_sf.pdf>, Jan. 16, 2008, 2 pgs.

* cited by examiner

AUTOMATIC SHARING AND PUBLICATION OF MULTIMEDIA FROM A MOBILE DEVICE

FIELD OF THE INVENTION

This invention relates generally to wireless mobile devices, and more particularly to sharing multimedia from such mobile devices.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever: Copyright© 2006, FullPower, Inc., All Rights Reserved.

BACKGROUND OF THE INVENTION

Most current cellular telephones contain a camera. However, the possible delivery locations for the media are limited. Electronic communications and publications, such as e-mail, social networking web sites, RSS feeds, personal blogs, news sites, etc. are increasingly incorporating media such as videos and photos. Camera phones do not currently have the ability to send to all of these heterogeneous delivery locations. Users increasingly wish to send their media to multiple heterogeneous delivery locations and to do so without having to input each delivery location individually.

SUMMARY OF THE INVENTION

Multimedia from a mobile device is automatically distributed to multiple and various types of shares specified by a default destination. The mobile device generates a media package from the multimedia and sensor meta data. The media package is transmitted to a server that optimizes the multimedia before distributing the multimedia to the shares. Alternatively, the multimedia may be distributed to shares specified in a different destination that is input through the mobile device. Delivery instructions corresponding to the shares for the different destination are included in the media package. In another aspect, the mobile device sends share identifiers to the server to define the default destination for the user account.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized that logical, mechanical, electrical, functional, and other changes may be made without departing from the scope of the present invention. The following detailed description is, therefore, not to be taken in a limiting sense, and the scope of the present invention is defined only by the appended claims.

Figure 1:
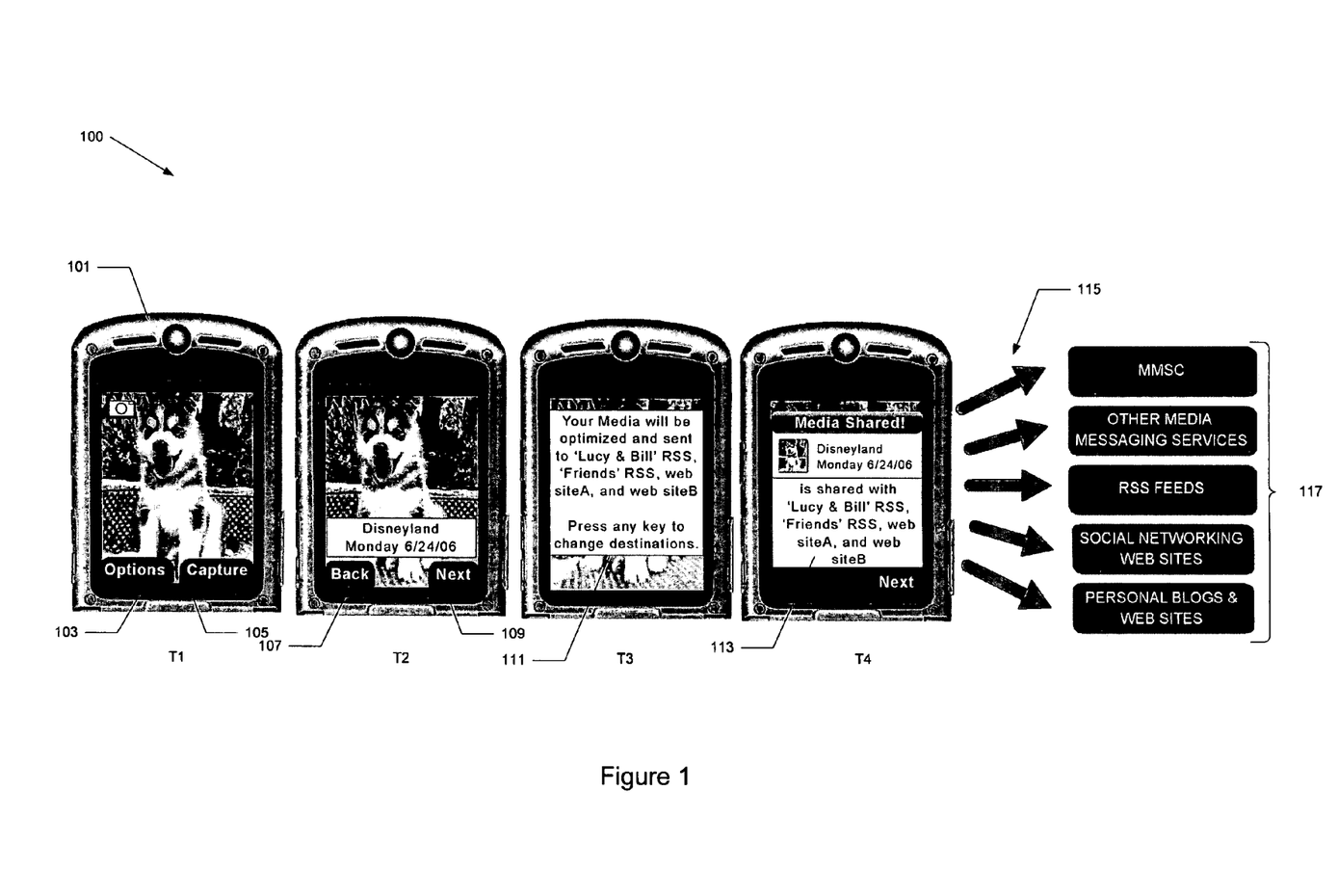
FIG. 1 is a diagram illustrating a mobile device operating in accordance with one embodiment of the invention.

FIG. 1 illustrates a mobile device 101, such as a cellular telephone, at various points during execution of one embodiment of an instant sharing client 100. The instant sharing client 100 is invoked when a user performs certain actions on the mobile device. Such actions include pressing a camera button, selecting a capture option from a menu, and similar actions that initiate the capture of multimedia. It will be appreciated that multimedia (also referred to as "media") includes audio, still images, video, and combinations thereof. The instant sharing client 100 displays two buttons, or soft keys, on the mobile device screen at time T1. An options button 103 causes the display of an options menu that is described further below. A capture button 105 causes the multimedia to be captured, along with related sensor data (also referred to as sensor "meta data"). After multimedia is captured, at time T2, the instant sharing client 100 displays two new buttons on the screen, back button 107, which allows the user to recapture the multimedia, and next button 109. Assuming the user activates the next button 109, at time T3, the instant sharing client 100 displays a destination message 111 on the mobile device. As shown in FIG. 1, the destination message indicates that the captured multimedia will be automatically distributed to various heterogeneous delivery locations that the user has previously specified as a default destination. The default destination may include any number and multiple types of delivery locations. For example, a default destination can include email addresses, mobile phone numbers, personal web blogs (publications), social networking and other Internet web sites, and RSS (really simple syndication) feeds, all of which are referred to herein as shares. At T4, the instant sharing client 100 sends 115 the multimedia to the user-selected shares 117 via a server, and displays a message 113 that the multimedia has been shared.

The instant sharing client 100 also allows the user to override the default destination by pressing any key and inputting different share identifiers using the options button 103. In one embodiment, the destination message 111 prompts the user to select up to ten pre-defined distribution choices, or "speed-shares," using keys 0 through 9 on the keypad of the phone, such as in speed-dialing. Each of these choices is a destination that can specify multiple heterogeneous shares. In another embodiment, the destination message 111 prompts the user to select from a list of recent shares that are not covered by the default destination or the speed-shares.

Although the mobile device of FIG. 1 has been described with reference to input through key presses, it will be appreciated that the invention is not so limited, and that other input techniques known in the art, such as voice commands and motion gestures, are contemplated as within the scope of the invention.

Figure 2:
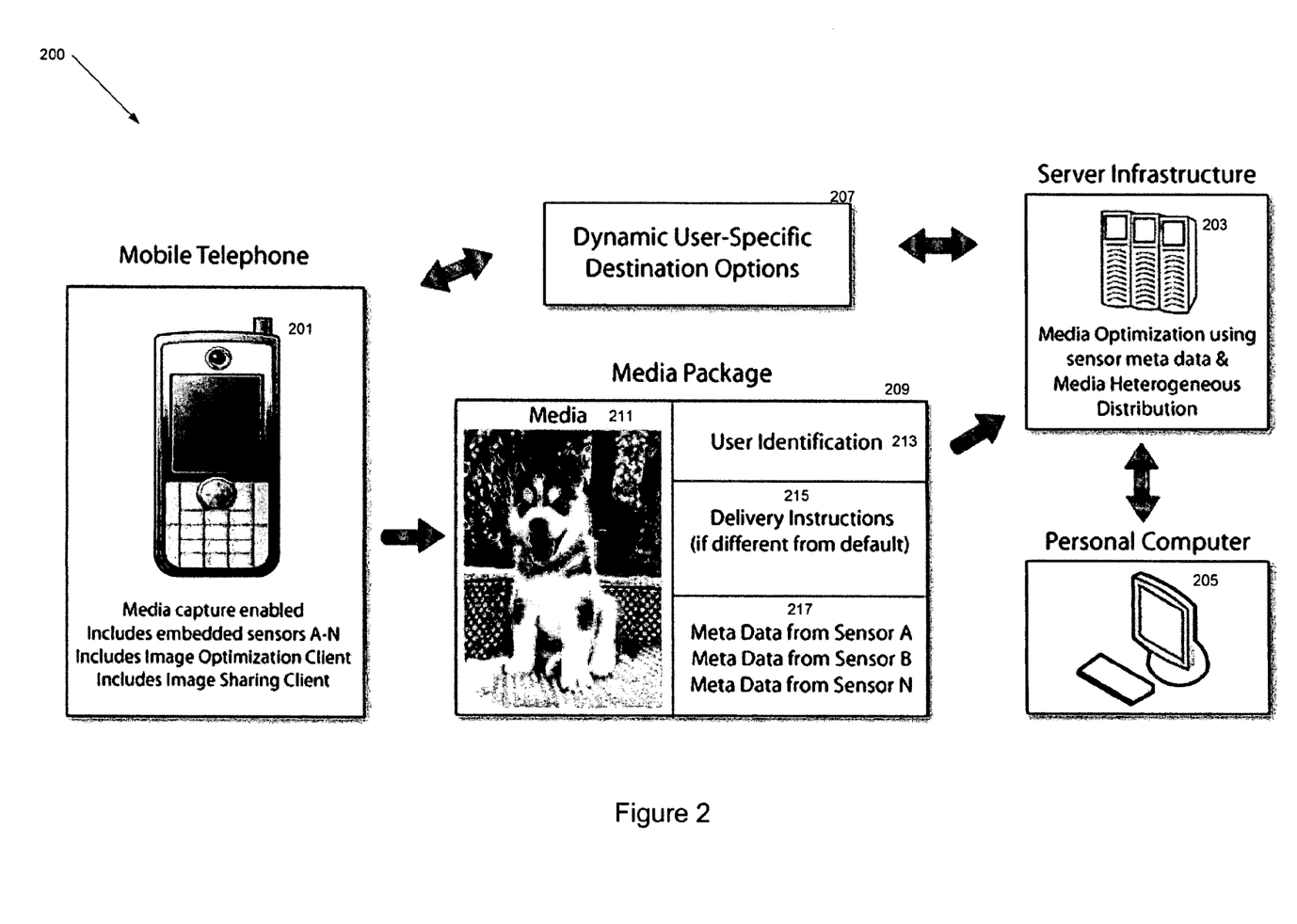
FIG. 2 is a diagram illustrating a system-level overview of an embodiment of the invention.

A system level overview of the operation of a sharing system 200 according to one embodiment is described with reference to FIG. 2. The sharing system comprises a mobile device 201 and one or more servers 203. Mobile device 201 includes the instant sharing client 100 described above, embedded sensors that capture the sensor meta data, and an image optimization client. The instant sharing client 100 generates a media package 209 containing the multimedia 211, user identification 213 for the user of the mobile device 201, delivery instructions 215 if the user overrode the default destination, and the sensor meta data 217, which it sends to the server(s) 203 through a standard mobile carrier network. When the server(s) 203 receives the media package, it optimizes the multimedia based on the sensor meta data. For example, if the mobile device is equipped with an inertial sensor (also known as an accelerometer), meta data from the inertial sensor may be used to remove blur artifacts from the multimedia as described in U.S. patent application Ser. No. 11/603,472, assigned to the same assignee as the present application. Individual share identifiers, speed-shares, and destinations input into the mobile device 201 are sent by the instant sharing client 100 to the server(s) 203 as destination options 207. In one embodiment, the destination options 207 are synchronized between the server(s) 203 and the instant sharing client 100 whenever changes are made to the destination options 207 on the mobile device 201 through the instant sharing client 100 or on the server(s) through another device, such as personal computer 205. The synchronization allows the user to change mobile devices 201 while having access to the same destination options 207. In one embodiment, the server(s) 203 only synchronize a subset of all the destination options 207 with the instant sharing client 100, such as the most recent, but maintain a history of all shares specified by the user.

In one embodiment, the server(s) 203 maintain an account for each user. Initial setup of the account may be performed on the mobile device 201 or through the personal computer 205. The initial setup may include having the user specify the shares for the default destination and the speed-shares, and collecting other information from the user, such as login credentials for shares that require them. In an alternate embodiment, the instant sharing client and server are configured to share multimedia without requiring a user account. In this case, the media package includes share identifiers input by the user since there is no default destination, but the media package does not include the user identification since there is no user account.

Figure 3A:
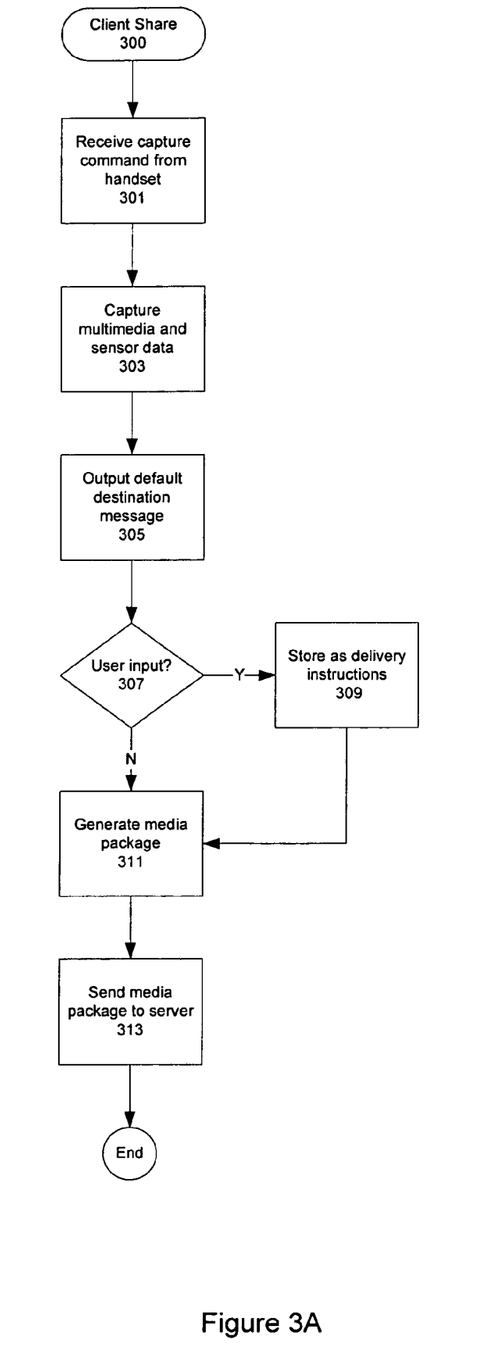
FIGS. 3A-B are flowcharts of methods to be performed by a client according to an embodiment of the invention.

FIGS. 3A and 3B illustrate methods to be executed on a mobile device according to one embodiment of the invention. Referring first to FIG. 3A, the acts to be performed by a mobile device executing a client share method 300 are shown. At block 301, the client share method 300 receives a capture command from the mobile device. The client share method 300 captures the multimedia and meta data from any embedded sensors (block 303). In one embodiment, the meta data is used when capturing the multimedia as described in U.S. patent application Ser. No. 11/603,472, assigned to the same assignee as the present application. For example, if the mobile device is equipped with an inertial sensor (accelerometer), the inertial sensor data is used to capture multimedia that does not have blur artifacts (blur from moving the mobile device while taking a picture). The inertial sensor data also may be sent in the media package as sensor meta data for further optimization of the multimedia by the server. The client share method 300 outputs the default destination message (block 305) and waits for a pre-determined period of time for user input (block 307). In one embodiment, a prompt message may be part of the default destination message or output as a separate message. If user input is received, at block 309 the client share method 300 stores the user input as delivery instructions. At block 311, the client share method 300 generates the media package that includes the multimedia and the user identification. If the user overrode the default destination at block 307, the delivery information from block 309 is also included in the media package. Data captured from any sensors embedded in the mobile device is included in the media package as sensor meta data. The client share method 300 sends the media package to the server (block 313).

It will be appreciated that the media package may be sent in the background asynchronously so that the mobile device can perform other actions without waiting for confirmation message from the server that the multimedia was successfully distributed. In one embodiment, various confirmation and error messages are sent to the instant sharing client by the server but only messages that require user action are output to the user.

Figure 3B:
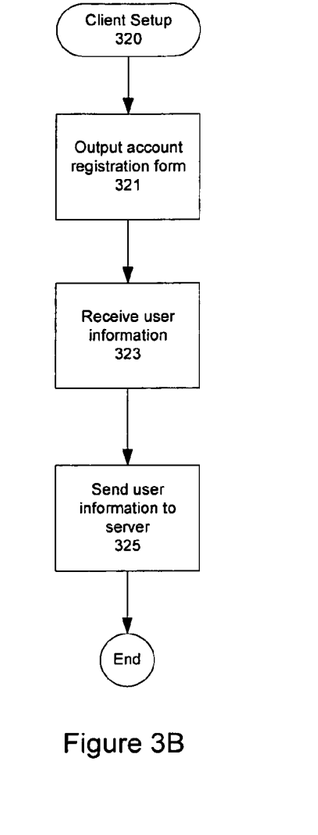

If the initial setup of the user's account is to be performed on the mobile device, the mobile device invokes a client setup method 320 as illustrated in FIG. 3B. The client setup method 320 outputs an account registration form on the mobile device (block 321) and receives the user information input (block 323). The user information is sent to the server at block 323. In one embodiment, the only information required to set up a user account is the share identifiers for the default destination. It will be appreciated that the account registration form may be a set of fields to be filled in or a set of questions to be answered. In addition, one of skill in the art will immediately understand that a similar setup method executes on a personal computer used to setup the user's account.

Figure 4A:
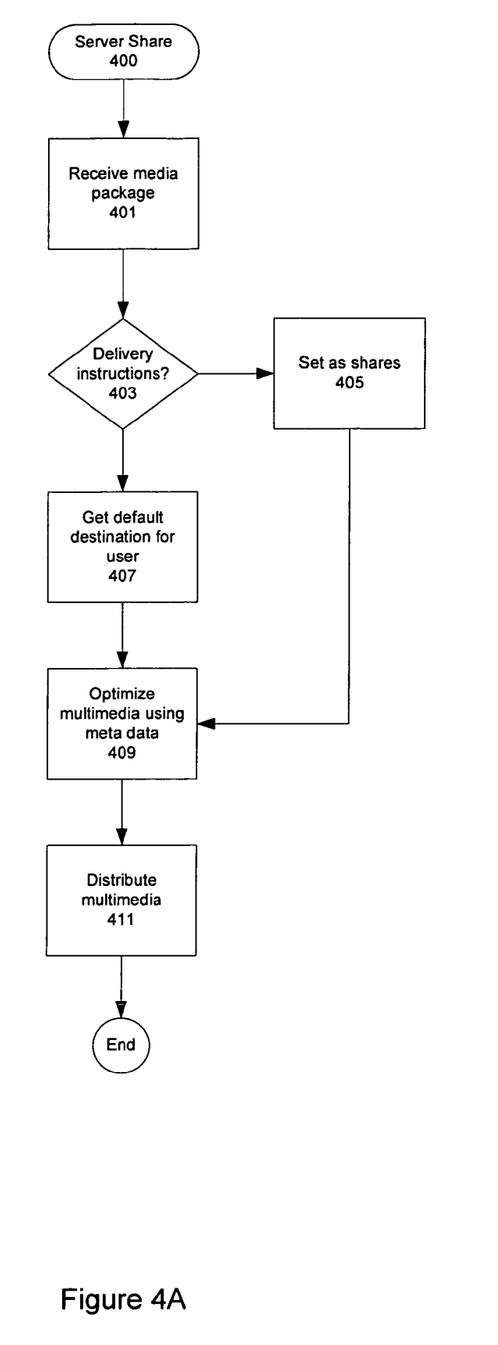
FIGS. 4A-B are flowcharts of methods to be performed by a server according to an embodiment of the invention.

FIGS. 4A and 4B illustrate server methods that operate in conjunction with the client methods of FIGS. 3A and 3B. FIG. 4A illustrate the acts to be performed by a computer acting as a server executing a server share method 400. The server share method 400 receives the media package from a mobile device (block 401) and determines if it includes delivery instructions (block 403). If it does, the server share method 400 sets the distribution shares to be those specified in the delivery instructions (block 405). If not, the server share method 400 retrieves the default destination associated with the user identified in the media package to determine the distribution shares (block 407). In either case, at block 409 the server share method 400 optimizes the multimedia according to the sensor meta data, if such optimization is necessary and the meta data is available, and distributes it at block 411.

Figure 4B:
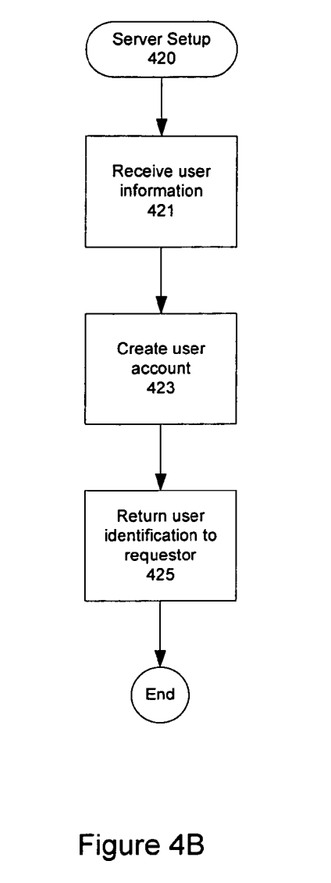

FIG. 4B illustrates the acts performed to setup a user account on the server. At block 421, a server setup method 400 receives user information from a requestor, such as a mobile device, a personal computer, or other networked device. The server setup method 400 creates the user account at block 423, and returns identification information associated with the user account to the requestor at block 425. If the requestor is not a mobile device, the user identification is subsequently transferred to the mobile device using standard data transfer techniques well-known in the art.

In practice, the methods 300, 320, 400 and 420 may constitute one or more programs made up of machine-executable instructions. Describing the method with reference to the flowchart in FIGS. 3A, 3B, 4A and 4B enables one skilled in the art to develop such programs, including such instructions to carry out the operations (acts) represented by the logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 3A, 3B, 4A and 4B without departing from the scope of the invention and that no particular order is implied by the arrangement of blocks shown and described herein.

Figure 5A:
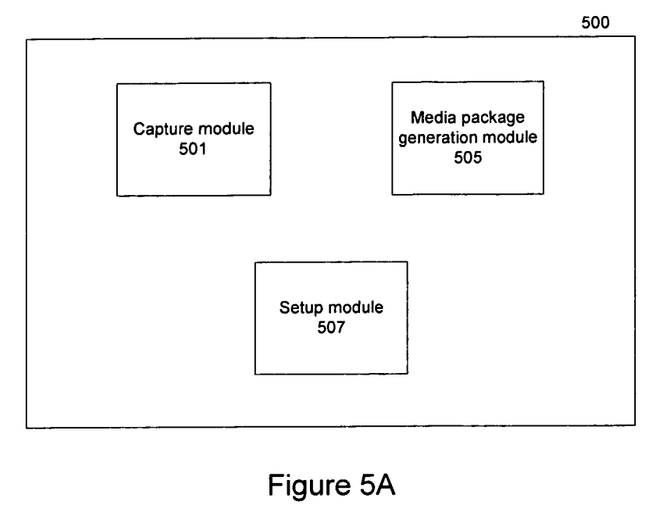
FIGS. 5A-B illustrate modules that implement the methods of the invention.

Particular implementations of the methods are now described with reference to modules illustrated in FIGS. 5A and 5B. In FIG. 5A, a set of modules 500 for a mobile device include a capture module 501, a media package generation module 505, and a setup module 507. The capture module 501 comprises computer instructions that capture the multimedia and the sensor meta data. The media package generation module 505 comprises instructions that combine the multimedia, any user identification, sensor meta data, and any delivery instruction into the media package for transmission to the server. In addition, the media generation module 505 comprises instructions that creates a network message containing the media package in accordance with the protocols of the network connecting the mobile device and the server. The setup module 507 comprises instructions that create an account registration form and format the received user information for transmission to the server.

Figure 5B:
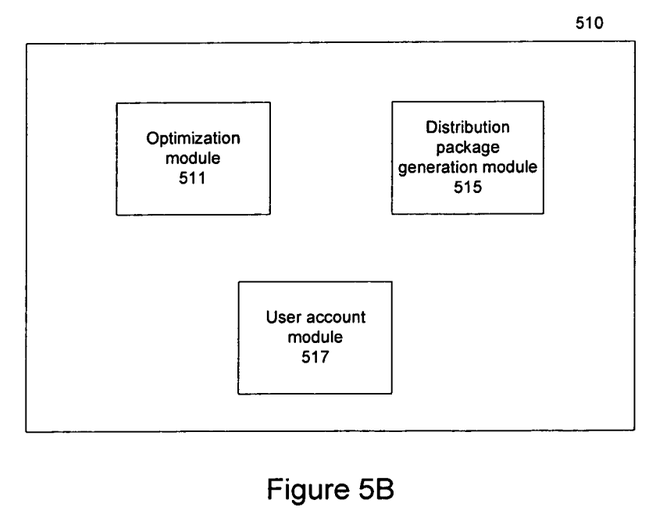

In FIG. 5B, a set of modules 510 for a server include an optimization module 511, a distribution package generation module 515, and a user account module 517. The optimization module 511 comprises instructions that optimize the multimedia based on any sensor meta data in a media package. The distribution package generation module 515 comprises instructions that determine a destination for the multimedia in the media package and generate a distribution package for the multimedia in accordance with the requirements of each share specified by the destination. In addition, the distribution package generation module 515 creates a network message containing the distribution package in accordance with the protocols of the network connecting the server and the corresponding share. The user account module 217 comprises instructions that create an account for a user and retrieve the default destination from a user's account.

Figure 6:
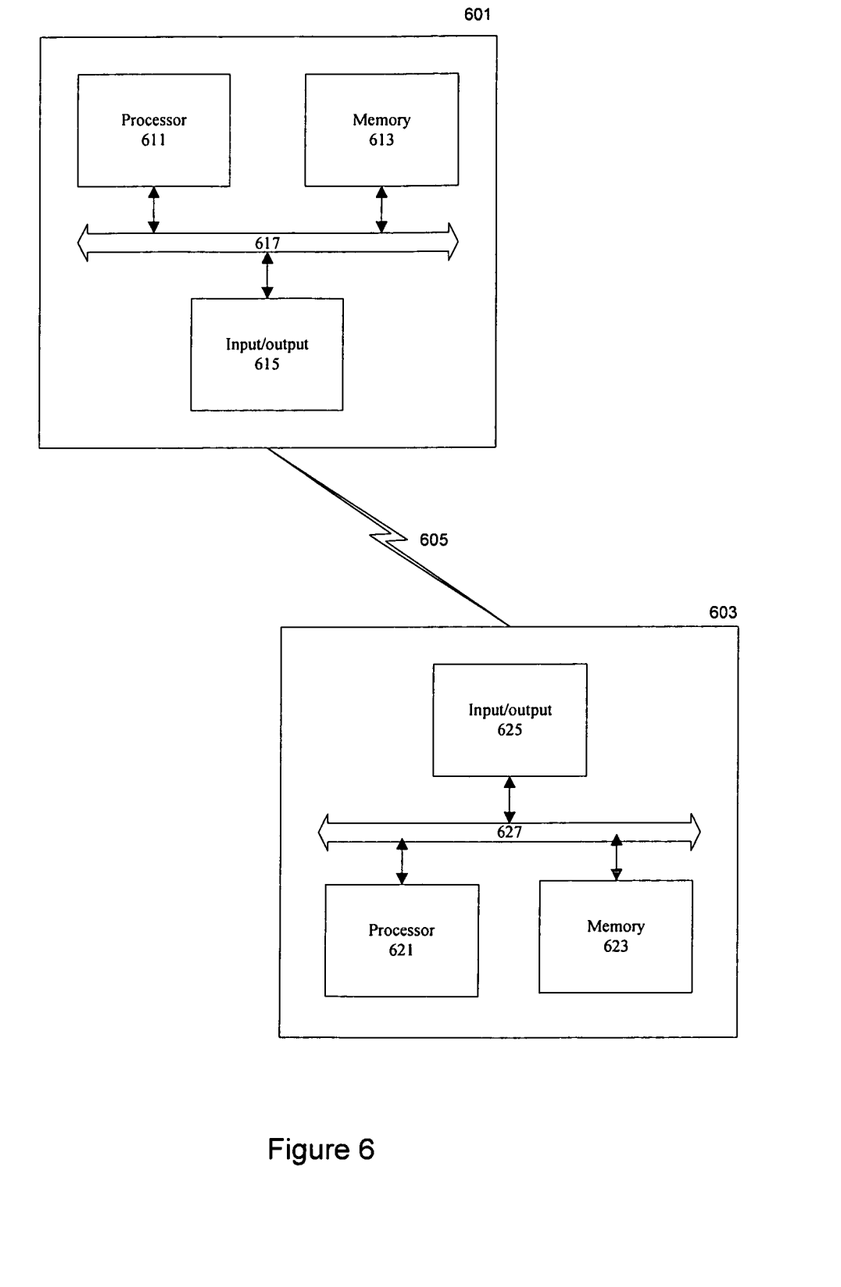
FIG. 6 is a diagram of one embodiment of a mobile device and a computer system suitable for use with the invention.

The following description of FIG. 6 is intended to provide an overview of hardware and other operating components suitable for performing the methods of the invention described above, but is not intended to limit the applicable environments. As shown in FIG. 6, a mobile device 601 is connected to a server 603 through a wireless network 605. The mobile device 601 contains a processor 611, memory 613, and an input/output component 616 coupled to a bus 617. The memory 613 is configured to store instructions which, when executed by the processor 611, perform the methods described with reference to FIGS. 3A and 3B. In addition, the memory 613 stores the modules illustrated in FIG. 5A and the mobile device data described above. The input/output component includes a display and a key pad, and a network interface.

Similarly, the server 603 contains a processor 621, memory 623, and an input/output component 625 coupled to a bus 627. The memory 623 is configured to store instructions which, when executed by the processor 621, perform the methods described with reference to FIGS. 4A and 4B. In addition, the memory 623 stores the modules illustrated in FIG. 5B and the server data described above. The input/output component 625 includes a network interface for connecting to the mobile device 601. In addition, the input/output component 625 includes a network interface for connecting to the networks on which the shares reside.

The input/output components 615, 625 also encompass various types of computer readable media, including any type of storage device that is accessible by the processors 611, 621. One of skill in the art will immediately recognize that the term "computer readable medium/media" further encompasses a carrier wave that encodes a data signal. It will also be appreciated that the mobile device 601 and the computer 603 are controlled by operating system software executing from their respective memories. The input/output components and related media store the computer-executable instructions for the operating system and methods of the present invention as well as data.

One of skill in the art will immediately appreciate that the invention can be practiced with other system configurations, including multiprocessor systems, microprocessor-based or programmable consumer electronics, network PCs, mini-computers, mainframe computers, and the like. The invention can also be practiced in distributed computing environments where tasks are performed by remote processing devices that are linked through a communications network.

The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

The automatic and instant distribution of multimedia from a mobile device to multiple heterogeneous delivery locations, such as such as e-mail addresses, RSS feeds, social networking sites, and web blogs, has been described. Users configure a default destination to specify the desired delivery locations, and the multimedia is automatically and instantly sent to these delivery locations without any additional configuration. For example, a user may configure their primary default destination list to include their personal web 'blog', certain e-mail addresses, certain phone numbers, a social networking sites, and an RSS feed or any subset thereof. When the user subsequently captures multimedia with their mobile device, it is instantly shared to these delivery locations without any further input being required. Additionally, the media may be enhanced on the server before delivery to remove motion-blurring using meta data taken from sensors on the mobile device.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computerized method comprising:
   generating a media package from multimedia captured by a mobile device;
   transmitting the media package to a server to automatically transmit by the server an optimized version of the multimedia to shares specified in delivery instructions within the media data package, the delivery instructions specifying one or more user-specified shares different than a plurality of shares in default delivery destinations associated with a user account, the shares specified in the delivery instructions and the default delivery destinations identifying heterogeneous delivery locations for the multimedia, the media package including sensor data captured by the mobile device that is indicative of physical or environmental information of the mobile device when the multimedia data was captured, the sensor data utilized by the server to optimize the multimedia by alteration of the multimedia based on the sensor data in the media package;
   storing share identifiers, in the user account, for the one or more user-specified shares as new default delivery destinations for a future multimedia transmission by the server;
   synchronizing the share identifiers associated with the user account for the new default delivery destinations with a second server; and
   the second server utilizing the share identifiers for the new default delivery destinations for the automatic transmission of an optimized version of a second multimedia data received in a second multimedia package from a second mobile device, the second multimedia package referencing the user identification for the user account.

2. The computerized method of claim 1 further comprising:
   receiving a different destination through the mobile device, the different destination comprising a plurality of shares that override the shares of the default destination.

3. The computerized method of claim 2, wherein receiving the different destination comprises:
   receiving a numeric input; and
   retrieving a destination associated with the numeric input.

4. The computerized method of claim 2, wherein receiving a different destination comprises:
   receiving share identifiers.

5. The computerized method of claim 1 further comprising:
   sending share identifiers to the server to define the default destination for the user account.

6. The computerized method of claim 1, wherein the heterogeneous locations comprise one or more of: internet sites, RSS feeds, web blogs, e-mail addresses, and phone numbers.

7. The computerized method of claim 1 further comprising:
   determining, by the server, the shares for the multimedia in the media package;
   optimizing the multimedia using sensor meta data in the media package; and
   distributing the multimedia to the shares.

8. The computerized method of claim 7, wherein determining the shares comprises:
   using the default destination if there are no delivery instructions in the media package.

9. The computerized method of claim 8, wherein determining the shares comprises:
   retrieving the delivery instructions from the media package, the delivery instructions corresponding to shares different than those of the default destination.

10. The computerized method of claim 7, wherein the physical or environmental information provided by the sensor comprises data from an accelerometer utilized by the server to reduce blur effect in the multimedia captured by the mobile device.

11. The computerized method of claim 1 further comprising:
    associating, by the server, shares identifiers with the user account to define the default delivery destinations.

12. A computerized method comprising:
    determining a destination for multimedia in a media package, the destination specifying shares in delivery instructions within the media package that identify heterogeneous delivery locations for the multimedia;
    optimizing the multimedia using sensor meta data, indicative of physical or environmental information of a mobile device that captured the multimedia, in the media package, the optimized multimedia altered based on sensor meta data;
    transmitting the multimedia to the shares specified in the delivery instructions;
    storing share identifiers, in a user account, for the shares specified in the delivery instructions as new default delivery destinations for a future media package transmission;
    synchronizing the share identifiers associated with the user account for the new default delivery destinations; and
    utilizing the share identifiers for the new default delivery destinations for the automatic transmission of an optimized version of a second multimedia data received in a second media package from a second device, the second media package referencing a user identification for the user account.

13. The computerized method of claim 12, wherein determining the destination comprises:
    retrieving a default destination associated with the user account if there are no delivery instructions in the media package.

14. The computerized method of claim 13, wherein determining the destination comprises:
    retrieving the delivery instructions from the media package, the delivery instructions corresponding to shares different than those of the default destination.

15. The computerized method of claim 14 further comprising:
    associating share identifiers with a user account to define the default destination for the user account.

16. The computerized method of claim 15 further comprising:
    returning user identification for the user account.

17. The computerized method of claim 12, wherein the physical or environmental information comprises sensor meta data from an accelerometer utilized to reduce blur effect in the multimedia captured by the mobile device.

18. The computerized method of claim 12, wherein the heterogeneous locations comprise internet sites, RSS feeds, web blogs, e-mail addresses, and phone numbers.

19. A non-transitory computer-readable medium embodying executable instructions, the instructions comprising:
    generating a media package from multimedia captured by a mobile device;
    transmitting the media package to a server to automatically transmit by the server an optimized version of the multimedia to shares specified in delivery instructions within the media data package, the delivery instructions specifying one or more user-specified shares different than a plurality of shares in default delivery destinations associated with a user account, the shares specified in the delivery instructions and the default delivery destinations identifying heterogeneous delivery locations for the multimedia, the media package including sensor data captured by the mobile device that is indicative of physical or environmental information of the mobile device when the multimedia data was captured, the sensor data utilized by the server to optimize the multimedia by alteration of the multimedia based on the sensor data in the media package;

storing share identifiers, in the user account, for the one or more user-specified shares as new default delivery destinations for a future multimedia transmission by the server;

synchronizing the share identifiers associated with the user account for the new default delivery destinations with a second server; and the second server utilizing the share identifiers for the new default delivery destinations for the automatic transmission of an optimized version of a second multimedia data received in a second multimedia package from a second mobile device, the second multimedia package referencing the user identification for the user account.

20. The non-transitory computer-readable medium of claim 19, wherein the instructions further comprise:
receiving a different destination through the mobile device, the different destination comprising a plurality of shares that override the shares of the default destination.

21. The non-transitory computer-readable medium of claim 20, wherein receiving the different destination comprises:
receiving a numeric input; and
retrieving a destination associated with the numeric input.

22. The non-transitory computer-readable medium of claim 20, wherein receiving a different destination comprises:
receiving share identifiers.

23. The non-transitory computer-readable medium of claim 19, wherein the instructions further comprise:
sending share identifiers to the server to define the default destination for the user account.

24. The non-transitory computer-readable medium of claim 19, wherein the heterogeneous locations comprise internet sites, RSS feeds, web blogs, e-mail addresses, and phone numbers.

25. A non-transitory computer-readable medium embodying executable instructions, the instructions comprising:
determining a destination for multimedia in a media package, the destination specifying shares in delivery instructions within the media package that identify heterogeneous delivery locations for the multimedia;
optimizing the multimedia using sensor meta data, indicative of physical or environmental information of a mobile device that captured the multimedia, in the media package, the optimized multimedia altered based on sensor meta data;
transmitting the multimedia to the shares specified in the delivery instructions;
storing share identifiers, in a user account, for the shares specified in the delivery instructions as new default delivery destinations for a future media package transmission;
synchronizing the share identifiers associated with the user account for the new default delivery destinations; and
utilizing the share identifiers for the new default delivery destinations for the automatic transmission of an optimized version of a second multimedia data received in a second media package from a second device, the second media package referencing a user identification for the user account.

26. The non-transitory computer-readable medium of claim 25, wherein determining the destination comprises:
retrieving a default destination associated with the user account if there are no delivery instructions in the media package.

27. The non-transitory computer-readable medium of claim 26, wherein determining the destination comprises:
retrieving the delivery instructions from the media package, the delivery instructions corresponding to shares different than those of the default destination.

28. The non-transitory computer-readable medium of claim 27, wherein the instructions further comprise:
associating share identifiers with a user account to define the default destination for the user account.

29. The non-transitory computer-readable medium of claim 28, wherein the instructions further comprise:
returning user identification for the user account.

30. The non-transitory computer-readable medium of claim 25, wherein the physical or environmental information comprises sensor meta data from an accelerometer utilized to reduce blur effect in the multimedia captured by the mobile device.

31. The non-transitory computer-readable medium of claim 25, wherein the heterogeneous locations comprise internet sites, RSS feeds, web blogs, e-mail addresses, and phone numbers.

32. An apparatus comprising:
means for generating a media package from multimedia captured by a mobile device;
means for transmitting the media package to a server to automatically transmit by the server an optimized version of the multimedia to shares specified in delivery instructions within the media data package, the delivery instructions specifying one or more user-specified shares different than a plurality of shares in default delivery destinations associated with a user account, the shares specified in the delivery instructions and the default delivery destinations identifying heterogeneous delivery locations for the multimedia, the media package including sensor data captured by the mobile device that is indicative of physical or environmental information of the mobile device when the multimedia data was captured, the sensor data utilized by the server to optimize the multimedia by alteration of the multimedia based on the sensor data in the media package;
means for storing share identifiers, in the user account, for the one or more user-specified shares as new default delivery destinations for a future multimedia transmission by the server;
means for synchronizing the share identifiers associated with the user account for the new default delivery destinations with a second server; and
means for the second server utilizing the share identifiers for the new default delivery destinations for the automatic transmission of an optimized version of a second multimedia data received in a second multimedia package from a second mobile device, the second multimedia package referencing the user identification for the user account.

33. The apparatus of claim 32 further comprising:
means for receiving a different destination, the different destination comprising a plurality of shares that override the shares of the default destination.

34. The apparatus of claim 32, wherein the means for transmitting further sends share identifiers to the server to define the default destination for the user account.

35. The apparatus of claim 32 further comprising:
means for formatting user information for transmission to the server to set up the user account.

36. An apparatus comprising:
means for generating a distribution package from multimedia in a media package, wherein the means for generating further determines a destination for the multimedia, the destination specifying shares based on delivery instructions within the media package that identify heterogeneous delivery locations for the multimedia;
means for optimizing the multimedia using any sensor meta data, indicative of physical or environmental information of a mobile device that captured the multimedia, in the media package, the optimized multimedia altered based on sensor meta data;
means for transmitting the multimedia to the shares based on the delivery instructions;
means for storing share identifiers, in a user account, for the shares specified in the delivery instructions as new default delivery destinations for a future media package transmission;
means for synchronizing the share identifiers associated with the user account for the new default delivery destinations; and
means for utilizing the share identifiers for the new default delivery destinations for the automatic transmission of an optimized version of a second multimedia data received in a second media package from a second device, the second media package referencing a user identification for the user account.

37. The apparatus of claim 36 further comprising:
means for managing a user account, wherein the means for managing retrieves a default destination associated with the user account if there are no delivery instructions in the media package.

38. The apparatus of claim 37, wherein the means for generating further retrieves the delivery instructions from the media package, the delivery instructions corresponding to shares different than those of the default destination.

39. The apparatus of claim 37, wherein the means for managing further associates share identifiers with a user account to define the default destination for the user account.

* * * * *